United States Patent

[15] 3,672,468

Schuster

[45] June 27, 1972

[54] LUBRICATING IDLER FOR ROLLER CHAINS OR THE LIKE

[72] Inventor: John D. Schuster, 6067 Sylvan Green Road, Sylvania, Ohio 43560

[22] Filed: Aug. 3, 1970

[21] Appl. No.: 60,460

[52] U.S. Cl. ............................................184/15 A, 184/102
[51] Int. Cl. .........................................................F16n 7/12
[58] Field of Search .....................184/2, 3 R, 3 A, 102, 15 R, 184/15 A, 15 B, 16, 17; 74/230, 257

[56] References Cited

UNITED STATES PATENTS

| 2,675,098 | 4/1954 | Cole | 184/102 |
| 1,914,093 | 6/1933 | Adams | 184/16 X |
| 2,800,199 | 7/1957 | Mlynarek | 184/16 |
| 2,909,937 | 10/1959 | Williams | 74/230 |
| 2,951,557 | 9/1960 | Jung | 184/102 |
| 2,813,599 | 11/1957 | Amberg | 184/16 |

FOREIGN PATENTS OR APPLICATIONS

| 739,967 | 11/1955 | Great Britain | 184/16 |
| 134,260 | 9/1949 | Australia | 184/15 |

*Primary Examiner*—Manuel A. Antonakas
*Attorney*—Allen D. Gutchess, Jr.

[57] ABSTRACT

A lubricating device for a roller chain is provided. The device includes a sprocket for the roller chain with a pair of lubricating discs mounted on each side of the sprocket and extending a distance sufficient to engage the side plates of the chain when the teeth of the sprocket engage the chain. The lubricating discs preferably are slightly compressed when engaging the chain side plates to thereby be more effective in depositing lubricant on the chain. The lubricant can be supplied from a passage located centrally in an axle on which the sprocket and lubricating discs rotate, with passages extending radially through the sprocket and communicating with the lubricating discs and with the axle passage.

6 Claims, 3 Drawing Figures

PATENTED JUN 27 1972 3,672,468
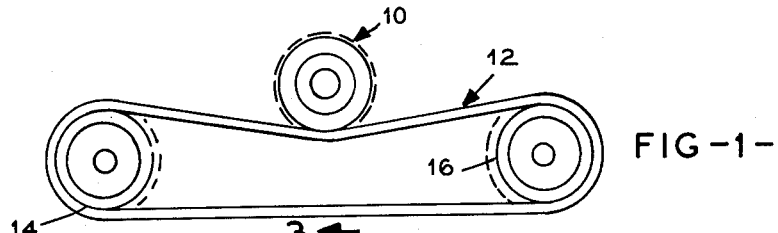
FIG-1-
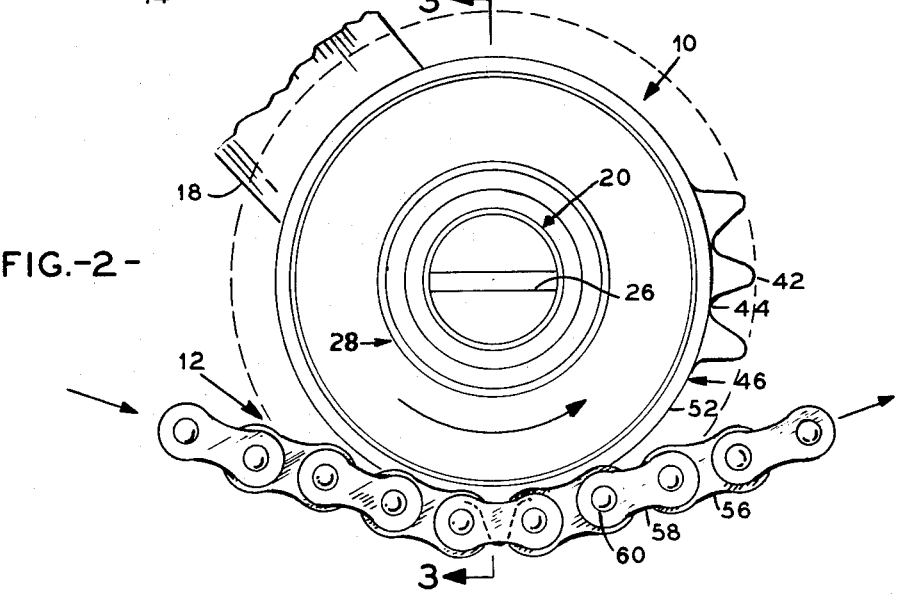
FIG.-2-
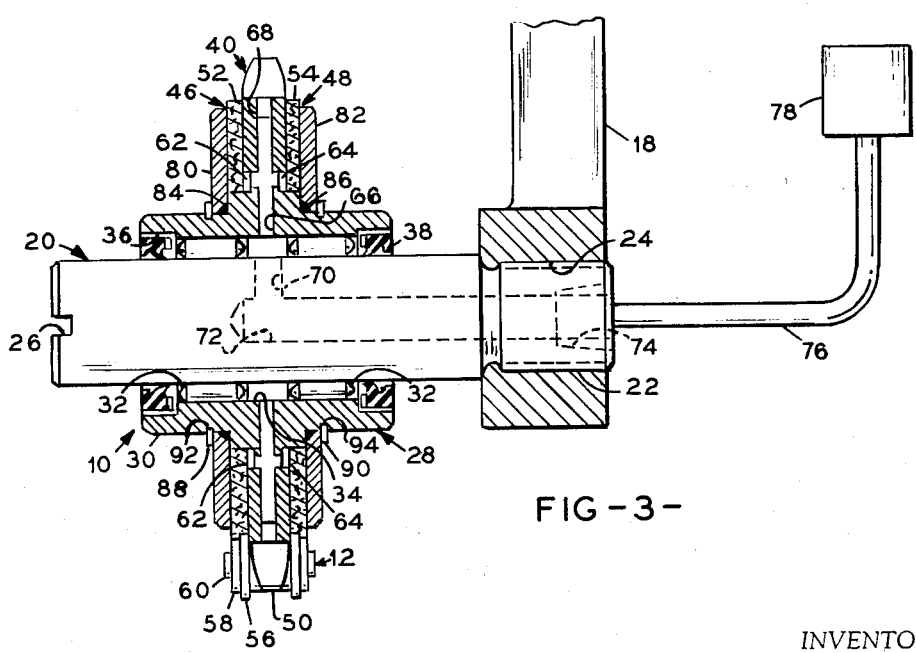
FIG-3-
INVENTOR.
JOHN D. SCHUSTER
BY
Allen D. Hutchess, Jr.

LUBRICATING IDLER FOR ROLLER CHAINS OR THE LIKE

This invention relates to a lubricating device for an articulated elongate member and particularly for a roller chain.

Numerous lubricating devices for various articulated conveying members, including roller chains, are known in the art. Most of such devices have been less than effective in providing adequate lubrication particularly when the chain is under a substantial load or traveling at high speeds, or both. Other devices which have been fairly effective in supplying the lubricant have been excessively costly or cumbersome or have deposited an excessive amount of oil. Bath-type lubricators perhaps have been the most effective of the known lubricators for lubricating roller chains. However, lubricators of this type have also required good seals where the chain enters and exits the lubricator, with these seals requiring frequent maintenance to prevent excessive leakage.

The lubricating device according to the invention includes an axle on which a chain-engaging member, preferably a sprocket, is rotatably mounted and positioned to be in engagement with a roller chain. The sprocket can be in the form of an idler, but can be used to drive or be driven by the chain, if desired. A pair of annular lubricating discs are located at the sides of the sprocket and are spaced apart by the sprocket a distance sufficient to be in the same general plane as the side plates of the roller chain. The edges of the lubricating discs preferably do not extend outwardly from the axle as much as the sprocket but are near recesses between the sprocket teeth so as to be compressed slightly when engaged by the chain. The slight compression aids in a pumping action to feed the lubricant through the discs but is not sufficient to cause any undue wear of the lubricating discs. A pair of retaining rings are located outside the discs to aid in retaining the lubricant in the lubricating discs. The outer edges of the retaining discs stop short of the outer edges of the lubricating discs so as not to interfere with the compression of the lubricating discs by the roller chain.

In a preferred form, the lubricant is supplied to the lubricating disc through a passage located centrally in the axle. This passage connects with a transverse passage which communicates with an annular space around the axle adjacent the bearings supporting the sprocket. Radially extending passages in the sprocket communicate with this space and also communicate with annular grooves in the sprocket located adjacent the lubricating discs so as to supply the lubricant uniformly therearound.

The lubricating device according to the invention supplies the lubricant exactly where it is needed, at the side plates of the roller chain and not centrally of the roller pin. Further, the device does not tend to throw lubricant, although the lubricant does tend to move out through the periphery of the lubricating discs faster under higher centrifugal force so as to supply more lubricant when the chain runs faster and when the chain therefor needs more lubricant. By placing the lubricant at the points it is needed the most, the effectiveness of the lubrication is thereby increased; tests under various loads and speeds have indicated that the life of the roller chain is substantially extended when using a lubricator according to the invention.

It is, therefore, a principal object of the invention to provide a lubricating device for articulated elongate members which supplies lubricant more effectively thereto.

Another object of the invention is to provide a lubricating device for roller chains and the like, which device effectively supplies the lubricant even at higher speeds and loads.

A further object of the invention is to provide a lubricating device for roller chains and the like which is more compact, less expensive, and requires less maintenance than those devices heretofore known.

Many other objects and advantages of the invention will be apparent from the following detailed description of a preferred embodiment thereof, reference being made to the accompanying drawing, in which:

FIG. 1 is a somewhat schematic view in elevation of a roller chain application and a lubricating device embodying the invention;

FIG. 2 is an enlarged side view in elevation of the lubricating device of FIG. 1; and FIG. 3 is a view in transverse vertical cross section of the device, taken along the line 3—3 of FIG. 2.

Referring to FIG. 1, an idler lubricating device according to the invention is indicated at 10 and is engaged with a roller chain or other articulated elongate member 12 which extends around end sprockets 14 and 16, one of which can be driven. The lubricating device 10 can be used in place of one of the sprockets 14 and 16 and can also be drive, if desired. The device has been tested extensively with the chain 12 under various speeds and loads in the environment of FIG. 1 and has been found to be very effective in supplying lubricant, such as oil, to the portions of the chain needing it the most, and thereby extend the life of the chain. This is true even through the position of the lubricating device 10 in FIG. 1 represents one of the poorest lubricating situations, since the lubricant is applied by the device 10 to the outside of the chain and the lubricant tends to be moved further outside under the influence of centrifugal force, as the chain moves around the sprockets 14 and 16. Where space permits, the lubricating device is preferably placed within the path of the chain so as to engage the inner surface of the chain. The lubricant then applied to the inner surface tends to be distributed through the chain by centrifugal force as the chain moves around the sprockets. It will be understood that the lubricating device 10 can be effectively used with other articulated elongate members requiring lubrication, in addition to roller chains.

Referring to FIGS. 2 and 3, the lubricating device 10 is mounted on a suitable supporting arm 18, in a position to engage the chain 12, the engagement being at least sufficient to cause the device 10 to rotate when in contact with the chain or to cause the chain to move in a predetermined path if it is driven by the device 10. The lubricating device 10 includes a shaft 20 having a threaded end 22 received in a threaded opening 24 of the support 18. The shaft 20 can be assembled with the support with the aid of a screwdriver slot 26 located at the outer end of the shaft 20.

A rotatable element 28 has a generally cylindrical hub 30 rotatably mounted on the shaft 20 through bearings 32, these being needle bearings as shown, although other bearings, such as bronze sleeve bearings, can be employed. The bearings 32 are spaced apart to form an annular space 34 therebetween and the outer ends of the cylindrical hub 30 are recessed at 36 to receive end seals 38 which retain lubricant within the confines of the hub 30. The rotatable element 28 further includes a sprocket or rigid chain-supporting member 40 functionally integral with the cylindrical hub 30 and extending radially outwardly. As shown, the sprocket 40 terminates in sprocket teeth 42 with recesses 44 therebetween. The configuration of the teeth and the recesses 42 and 44 is not critical, however, it only being necessary that the engagement be sufficient for the supporting member 40 to rotate when engaged with the chain 12, or for the chain to move if the member 40 is to drive the chain. Even a circular edge for the member 40 may be adequate as long as it rotates and also forms the primary support between the lubricating device 10 and the chain 12.

Two annular lubricating discs or members 46 and 48 are located at the sides of the supporting sprocket 40 and are spaced apart by the thickness of the sprocket 40. The sprocket 40 is of a thickness slightly less than the length of chain rollers 50 of the chain 12 so that outer circular peripheries 52 and 54 of the lubricating discs are positioned to engage side plates 56 and 58 of the roller chain which are pivotally mounted on pins 60 at the ends of the rollers 50. With this arrangement, the lubricant from the discs 46 and 48 is applied exactly where it is needed, namely at the joints of the side plates 56 and 58 and the pins 60.

As shown particularly in FIG. 2, the circular edges 52 and 54 of the lubricating discs 46 and 48 preferably extend outwardly approximately to the recesses 44 of the sprocket 40. With this arrangement, the side plates 56 and 58, particularly 56, will engage and compress the lubricating discs 46 and 48 slightly as the chain rollers 50 are received in the recesses 44. The relative positions of the peripheral edges 52 and 54 of the lubricating discs 46 and 48 may be varied somewhat in their relationship to the sprocket recesses 44 and the teeth 42, depending upon the particular configuration of the specific articulated chain being lubricated. However, the relative peripheries of the sprocket 40 and the lubricating discs should be such that the chain is supported by the sprocket 40 and only slight radial pressure is applied to the lubricating discs by the chain components. The slight deformation of the lubricating discs is preferred, since it provides a pumping action which further aids in the flow of the lubricant through the lubricating discs, although the deformation is not essential to attain adequate flow. The material of which the discs are made can be of a fibrous nature, as in the form of felt, can be of a foam material with interconnecting cells, can be of porous metal, or can be of a rigid material with control orifices or passages, by way of example.

The lubricant can be supplied to the discs in various ways. As shown, annular grooves 62 and 64 are formed in the sides of the sprocket 40 and are in communication with inner portions of the lubricating discs 46 and 48. These are in communication with four radially extending passages 66 in the sprocket which communicate with the space 34 between the bearings 32. The passages 66 are formed by drilling radially inwardly from the periphery of the sprocket 40 with the outer ends of the passages 66 then closed off by suitable plugs 68. The axle 20 has a transverse passage 70 communicating with the space 34 and with an axially extending supply passage 72 which extends through the threaded end 22 of the axle 20 and terminates in a threaded recess 74. A suitable supply tube schematically shown at 76 is connected with the threaded recess 74 and supplies a lubricant from a supply source schematically indicated at 78. If the shaft 20 is rotated, a rotatable seal can be used to connect the tube 76 to the shaft instead of the threaded recess 74. Preferably, the lubricant is supplied from the source 78 in a controlled manner. The source 78 can be a drip cup or a reservoir from which lubricant is supplied under gravity through the tube 76. If a reservoir is used, flow control can be achieved by a solenoid valve operated by a timer. Actual tests have indicated that an oil supply of only one drop per minute is sufficient to provide proper chain lubrication for many applications, by way example.

Annular retaining discs 80 and 82 can be located at the outer surfaces of the lubricating discs 46 and 48 to more fully direct the lubricant to the outer peripheral edges 52 and 54 of the discs. O-ring seals 84 and 86 are located at the inner edges of the retaining discs, at the base of the sprocket 40. The retaining discs are held in position by retaining rings 88 and 90 received in grooves 92 and 94 of the cylindrical hub 30, with the retaining rings located immediately adjacent the outer surfaces of the retaining discs 80 and 82. Preferably, the outer circular edges of the retaining discs 80 and 82 extend as closely as as possible to the circular edges 52 and 54 of the lubricating discs 46 and 48 to contain the lubricant without interfering with the compression of the lubricating discs by the chain side plates.

From the above description, it will be seen that the lubricating device 10 supplies lubricant exactly where it is needed, at the chain side plates and pins, and does not waste lubricant by supplying it centrally to the roller 50. Also, with the uniform rotation of the discs 46 and 48, there is a minimal tendency for oil to be thrown outwardly from the discs and, if such should occur, the lubricating device can be easily shrouded. Further, at higher speeds, higher viscosity lubricants can be employed to minimize any tendency for oil to be thrown from the discs.

Various modifications of the above described embodiments of the invention will be apparent to those skilled in the art and it is to be understood that such modifications can be made without departing from the scope of the invention, if they are within the spirit and the tenor of the accompanying claims.

I claim:

1. In a chain having rollers and side plates pivotally mounted at the ends of the rollers a lubricating idler for the chain, said idler comprising a supporting sprocket having teeth with recesses therebetween at an outer peripheral edge thereof to engage the chain, said sprocket having a thickness slightly less than the lengths of the rollers, means for rotatably supporting said sprocket, a lubricating member with a generally circular outer edge mounted adjacent each side of said sprocket and positioned to be aligned with the side plates of the chain, said lubricating members having outer edges extending outwardly beyond the recesses of said sprocket in order to be contacted and deformed by the side plates of the chain, and means for supplying lubricant to inner portions of said lubricating members.

2. A lubricating idler according to claim 1 characterized further by a retaining disc located adjacent each of said lubricating members on the side opposite said sprocket, with the outer edges of said retaining discs terminating short of the outer edges of said lubricating members.

3. A lubricating idler according to claim 1 characterized further by said means for supplying lubricant to said lubricating members comprises an annular groove formed on each side of said sprocket and in communication with annular inner portions of said lubricating members, said sprocket having a transverse passage extending parallel to the axis of rotation of said sprocket and in communication with both of said annular grooves, and said sprocket having a radially extending groove positioned transversely to the axis of rotation of said sprocket and in communication with said transverse passage.

4. In an articulated elongate member having a plurality of rollers with connecting means at the ends thereof, a lubricating device for the member, said device comprising a support, an axle extending from said support, a rigid supporting member rotatably mounted on said axle and having an outer edge adapted to engage and partially support the elongate member, said outer edge comprising a plurality of teeth with recesses therebetween, an annular lubricating member mounted adjacent each side of said supporting member and extending outwardly a distance sufficient to contact portions of the elongate member, a retaining disc located adjacent each of said lubricating members on the side thereof opposite said supporting member, said retaining discs having outer edges spaced inwardly from the outer edges of said lubricating members, whereby said lubricating members can be engaged and compressed by the articulated elongate member.

5. A lubricating device according to claim 4 characterized by said supporting member being rotatably mounted on said axle by two spaced bearings, and said means for supplying lubricant to said lubricating members comprises an elongate passage extending centrally through said axle, and a transversely extending passage through said axle communicating with said lubricating members between said bearings.

6. A lubricating device according to claim 4 characterized further by said rigid supporting member having a circular groove on each side thereof communicating with said lubricating members, said rigid supporting member having a groove extending transversely thereto and communicating with both of said annular grooves, said lubricating member further having at least one generally radially extending groove communicating with said transverse groove and with space between said axle and supporting member.

* * * * *